United States Patent
Naydenov et al.

(10) Patent No.: US 8,283,608 B2
(45) Date of Patent: Oct. 9, 2012

(54) METHOD FOR HEATING AT LEAST ONE COMPONENT OF AN SCR SYSTEM USING RESISTIVE HEATING ELEMENTS

(75) Inventors: Volodia Naydenov, Louvain-la-Neuve (BE); Nicolas Duret, Nancy (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 429 days.

(21) Appl. No.: 12/670,275

(22) PCT Filed: Jul. 24, 2008

(86) PCT No.: PCT/EP2008/059690
§ 371 (c)(1),
(2), (4) Date: Jan. 22, 2010

(87) PCT Pub. No.: WO2009/013329
PCT Pub. Date: Jan. 29, 2009

(65) Prior Publication Data
US 2010/0187218 A1    Jul. 29, 2010

(30) Foreign Application Priority Data
Jul. 26, 2007  (FR) ...................................... 07 56740

(51) Int. Cl.
*H05B 3/02* (2006.01)
(52) U.S. Cl. ........ 219/483; 219/485; 219/486; 219/507; 219/202; 219/206
(58) Field of Classification Search .................. 219/483, 219/485, 486, 507, 202, 206
See application file for complete search history.

(56) References Cited

U.S. PATENT DOCUMENTS

| 2,843,759 | A | | 7/1958 | Roots | |
| 3,955,268 | A | * | 5/1976 | Chou et al. | 29/25.03 |
| 4,015,104 | A | | 3/1977 | Eckman et al. | |
| 4,736,090 | A | * | 4/1988 | De Broeck et al. | 219/497 |
| 4,745,339 | A | | 5/1988 | Izawa et al. | |
| 5,061,447 | A | * | 10/1991 | Ono | 422/96 |
| 5,111,692 | A | * | 5/1992 | McQueen et al. | 73/295 |
| 6,409,969 | B1 | * | 6/2002 | Streicher et al. | 422/94 |
| 6,442,932 | B1 | * | 9/2002 | Hofmann et al. | 60/274 |
| 6,489,787 | B1 | * | 12/2002 | McFadden | 324/725 |
| 6,559,426 | B2 | * | 5/2003 | Jirmann | 219/480 |

(Continued)

FOREIGN PATENT DOCUMENTS
DE    1081983 B    5/1960
(Continued)

OTHER PUBLICATIONS

U.S. Appl. No. 12/677,643, filed Mar. 11, 2010, Frederic Peucat et al.

(Continued)

*Primary Examiner* — Viet Q Nguyen
(74) *Attorney, Agent, or Firm* — Oblon, Spivak, McClelland, Maier & Neustadt, L.L.P.

(57) ABSTRACT

Method for heating at least one component of an SCR system using several resistive heating elements, according to which these heating elements are fed in parallel by a current source and according to which a current sensor is placed in series with the current source and all the resistors, which are connected in parallel.

10 Claims, 5 Drawing Sheets

U.S. PATENT DOCUMENTS

Figure 1:
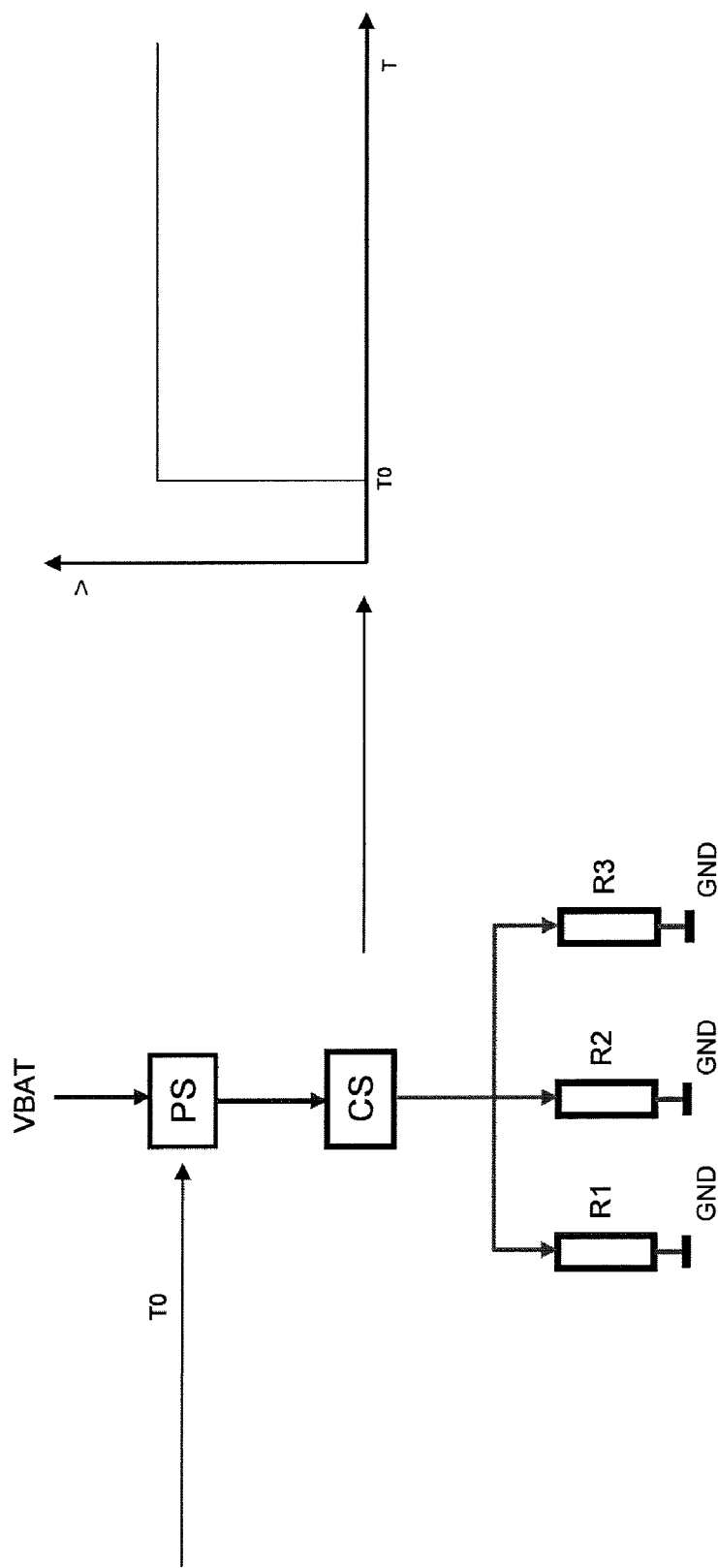

| | | | |
|---|---|---|---|
| 6,946,623 B2 * | 9/2005 | Evanyk | 219/240 |
| 7,401,510 B2 * | 7/2008 | Ando | 73/204.15 |
| 2009/0078692 A1 | 3/2009 | Starck | |
| 2010/0186374 A1 * | 7/2010 | Peucat et al. | 60/274 |

FOREIGN PATENT DOCUMENTS

| | | |
|---|---|---|
| FR | 2298248 A1 | 8/1976 |
| WO | WO 2006064001 A1 | 6/2006 |
| WO | WO 2007017080 A1 | 2/2007 |
| WO | WO 2009034175 A1 | 3/2009 |
| WO | WO 2009112516 A1 | 9/2009 |

OTHER PUBLICATIONS

U.S. Appl. No. 12/921,617, filed Oct. 15, 2010, Frederic Peucat et al.
DIN 70070 (Aug. 2003-Aug. 2005) standard : Diesel engines NOx•Reduction agent AUS 32 Quality requirements, 14 pgs.

* cited by examiner

METHOD FOR HEATING AT LEAST ONE COMPONENT OF AN SCR SYSTEM USING RESISTIVE HEATING ELEMENTS

CROSS-REFERENCE TO RELATED APPLICATIONS

This application is a U.S. national stage application under 35 U.S.C. §371 of International Application No. PCT/EP2008/059690 filed Jul. 24, 2008, which claims priority to French Patent Application No. 0756740 filed Jul. 26, 2007, these applications being incorporated herein by reference in their entirety for all purposes.

The present application relates to a method for heating at least one component of an SCR system using resistive heating elements and also to an SCR system component to which this method can be applied.

Legislation on vehicle and heavy goods vehicle emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also a device for metering the desired amount of additive and injecting it into the exhaust line.

Given that the aqueous urea solution generally used for this purpose (eutectic 32.5 wt % urea solution) freezes at −11° C., it is necessary to provide a heating device to liquefy the solution in order to be able to inject it into the exhaust line in the event of starting in freezing conditions.

Several systems have been provided in the prior art for this purpose. Generally, these systems comprise heating devices that involve either specific heating elements or a bypass of the engine cooling circuit (for example, see Application WO 2006/064001 in the name of the Applicant).

As regards the use of specific heating elements, it is known to put resistive heating elements inside the tank containing the urea solution, and optionally over the urea lines (feed lines and return lines, where appropriate), over the pump, the filter, etc. and other active components of the system.

Thus, for example, Application WO 2007/017080 recommends connecting two resistors (one for the tank and one for the filter) in series which makes it possible, with a given current, to adjust the heating power through the choice of suitable resistors. Connecting heating resistors in series has, however, the drawback of that if one of the resistors is faulty, the following ones will be deactivated. Moreover, with such a connection mode, if it is desired to carry out a diagnostic test (to automatically check that the resistors are operating correctly) using a current sensor, this is namely carried out globally (on all the resistors) and therefore does not make it possible to identify, from among the resistors used, which one is faulty.

The present invention aims to solve this problem by providing a method for heating an SCR system using several resistive heating elements, the good operation of which is controlled specifically using a single current sensor.

Therefore, the present application relates to a method for heating at least one component of an SCR system using several resistive heating elements, according to which these heating elements are fed in parallel by a current source and according to which a current sensor is placed in series with the current source and all the resistors, which are connected in parallel.

The expression "SCR system" is understood to mean a system for the catalytic reduction of the $NO_x$ from the exhaust gases of an internal combustion engine, preferably of a vehicle. The invention applies most particularly well to the systems using a precursor of liquid ammonia that is capable of freezing under the atmospheric conditions in certain parts of the globe. It applies particularly well to urea SCR systems.

The term "urea" is understood to mean any, generally aqueous, solution containing urea. The invention gives good results with eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

As mentioned previously, the SCR systems generally comprise at least one tank for storing the pollution-control liquid additive and also a system for feeding this to the exhaust gases, and which generally comprises active components such as a pump, filter, valve(s), conduits (feed and/or return conduits). The method according to the invention applies to any component of such a system, combination of such components or even to a complete SCR system.

The tank of such a system may be made from any material, preferably one that is chemically resistant to urea. In general, this is metal or plastic. Polyolefins, in particular polyethylene (and more particularly HDPE or high-density polyethylene), constitute preferred materials.

This tank may be produced by any conversion processes known in the case of hollow bodies. One preferred processing method, in particular when the tank is made of plastic, and in particular HDPE, is the extrusion-blow moulding process. In this case a parison (in one or more parts) is obtained by extrusion, and is then shaped by blow moulding in a mould. One-part moulding of the tank from a single parison gives good results.

This tank is advantageously equipped with a base plate or mounting plate (that is to say a support having substantially the shape of a plate) onto which at least one active accessory of the urea storage system and/or injection system is attached. This base plate generally has a perimeter, closed up on itself, of any shape. Usually, its perimeter has a circular shape.

In a particularly preferred manner, this base plate is a submerged mounting plate, i.e. a plate that seals an opening in the lower wall of the tank. The expression "lower wall" is in fact understood to mean the lower half of the tank (whether or not it is moulded in one piece or from two parison sheets or cut-outs). Preferably, the base plate is located in the lower third of the tank, and more particularly preferably, in the lower quarter, or even squarely in the bottom of this tank. It may be partly in the lower side wall, in which case it is slightly slanted once mounted in the vehicle. The location and/or direction of the base plate especially depends on the location of the tank in the vehicle, and on the space occupied around it (considering the components to be integrated therein).

This base plate therefore incorporates at least one component that is active during storage and/or injection. This is understood to mean that the component is attached to or produced as one part with the base plate. This component may be incorporated inside the tank, or on the outside with, if necessary, a connection (delivery tube) passing through it.

Preferably, the base plate according to this variant of the invention integrates several active storage and/or metering components and, more particularly preferably, it integrates all the active components which will be in contact with the liquid additive stored in, leaving from or arriving into the additive tank.

The base plate of the tank according to this variant of the invention may be obtained by any known means, but as a preference it is obtained by injection moulding, this method making it possible to obtain good dimensional accuracy.

Preferably, the base plate is based on a material that is resistant to urea and to the products generated during ageing of the latter, such as polyacetal, and in particular POM (polyoxymethylene); polyphthalamides (for example, AMODEL® grades); or polyamides, and in particular grades of polyamides that are reinforced (for example with glass fibres). Preferably, the base plate is made of polyamide and it comprises a delivery tube moulded as one piece with it as described previously.

The component to which the invention applies, and which may or may not be integrated into the aforementioned base plate, is equipped with at least two resistive elements connected in parallel (which does not rule out the fact that it could also comprise one or more such elements connected in series).

These resistive elements may be metallic heating filaments, flexible heaters, (that is to say heaters comprising one or more resistive track(s) affixed to a film or placed between two films (that is to say two substantially flat supports, the material and thickness of which are such that they are flexible)) or any other type of resistive elements that have a shape, size and flexibility suitable for being inserted into and/or wound around the component. For the tank and its base plate, where appropriate, flexible heaters are particularly suitable.

One advantage of flexible heaters is that they may have any shape, possibly even a complicated shape, so that a single heater (designed according to a sort of "pattern") may be used to heat various parts of the tank, even parts that are distant from one another. Thus, in one preferred variant, the flexible heater comprises a body and at least one excrescence or tentacle equipped with at least one part of a resistive track. Most particularly preferably, it comprises several excrescences or tentacles which are positioned uniformly in the tank so as to be able to heat its contents completely and as homogeneously as possible and this being even in the nooks distant from the body of the heater from which the tentacles extend. In this variant, the body of the heater may comprise a resistive track and the tentacles, at least one other resistive track, these tracks preferably being connected in parallel to a power supply terminal.

The term "body" is understood to mean a part of the heater where the tentacles start from or where the resistive tracks start from and arrive at.

The resistors (resistive heating elements) of the SCR system/component to which the method according to the invention applies, are fed by a current source.

This may be the battery of the vehicle which supplies around 12 volts nominal (generally with a minimum of 9 volts and a maximum of 16 volts).

Preferably, each resistor is grounded independently and the current sensor is inserted between the current source and the grounded resistors. Generally, the current sensor converts the current which passes through it (and which is therefore the sum of the currents which pass through each of the resistors) to a voltage with a given sensitivity. Generally, the voltage generated in the case of a zero current is not equal to zero but to a certain percentage of the supply voltage of the sensor (for example, around 10% of this voltage) and which is referred to as offset voltage. The advantage of such an offset is that the functioning of the sensor can be controlled (since if it works, voltage is not equal to zero even if there is no current passing through it).

The SCR systems are generally only heated below a certain temperature (starting from which the additive begins to solidify). For the aforementioned eutectic water/urea solutions this generally occurs at around −8° C.

Generally, these systems are controlled by an electronic control unit (ECU) which conditions, inter alia, the starting/stopping of the heating system, for example by acting on a single commutator (power switch, power MOSFET, etc.) positioned in the supply line between the current source and the resistors, preferably upstream of the current sensor. Therefore, in such a system, all the resistors are activated at the same time.

However, in the case where the resistors used have too large a dispersion relative to their nominal value, a reliable diagnostic test will not be able to be established in any eventuality. This is the case, for example, with a system having 2 resistors of very different values and/or where the current range read by the sensor in the case where the 2 resistors are operating correctly has an area in common with the range read when only one of the 2 (the smallest) is operating. This is illustrated by FIG. 1 and table 1 appended to the present document, which will be described in detail further on.

Therefore, according to one advantageous variant of the present invention, each resistor is respectively connected to the current source and grounded in order to form a resistive branch and the various resistive branches are activated sequentially (for example, using a commutator in each of them, the preceding being activated by a suitable control system (ECU)). In such a system, to each activation of a correctly operating branch corresponds an increment of the current read by the sensor (and therefore, of the voltage that it generates). A specific diagnostic test is therefore possible regardless of the respective values and the dispersions of the resistors used (since to each resistor corresponds a "jump" in voltage, the value of which is of little importance, its presence alone attesting to the correct operation of the resistor in question).

However, such a method will only enable to detect if a resistor is working (allows current to flow through it) or not, and not if it is malfunctioning (i.e. heating too much—which may lead to degradation of the system and of the urea solution—or not enough—which may also lead to degradation problems owed to frost).

Therefore, an improved method consists in measuring the current each time a resistor is activated and comparing the ratio of the currents to the ratio of the value (resistance) of the resistors. Such a method (which is exemplified for n=2 in FIGS. 3 to 5 attached) allows not only to get rid of the actual value of the voltage but also, to check the quality of each resistor independently (i.e. to determine if each resistor is heating correctly, insufficiently or too much).

Figure 3:
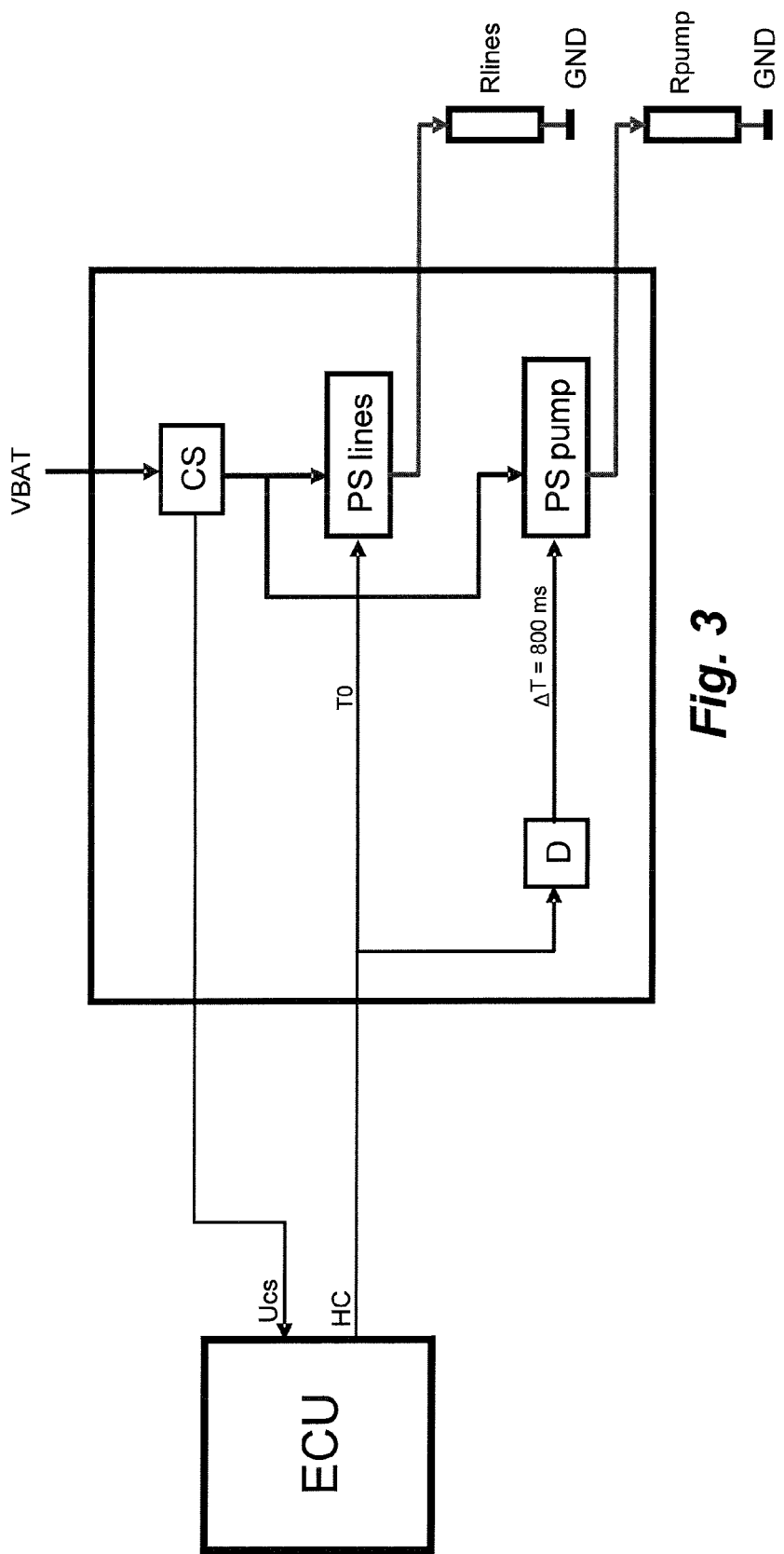
Figure 4:
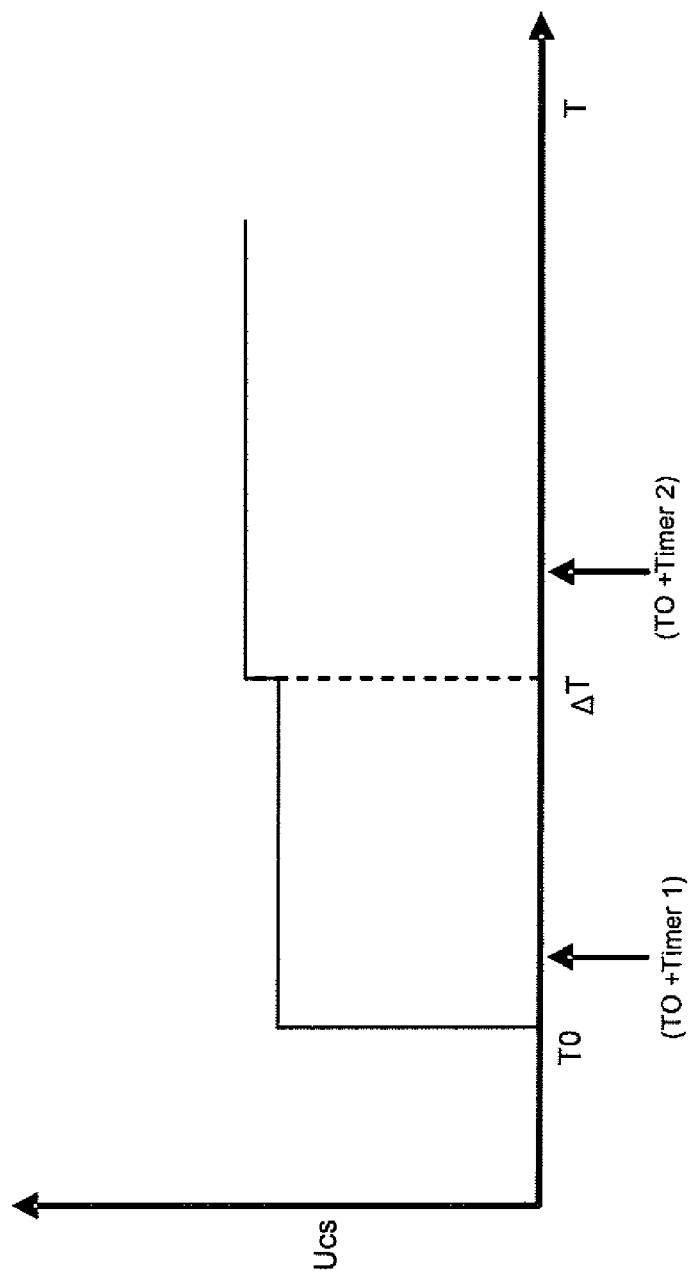
Figure 5:
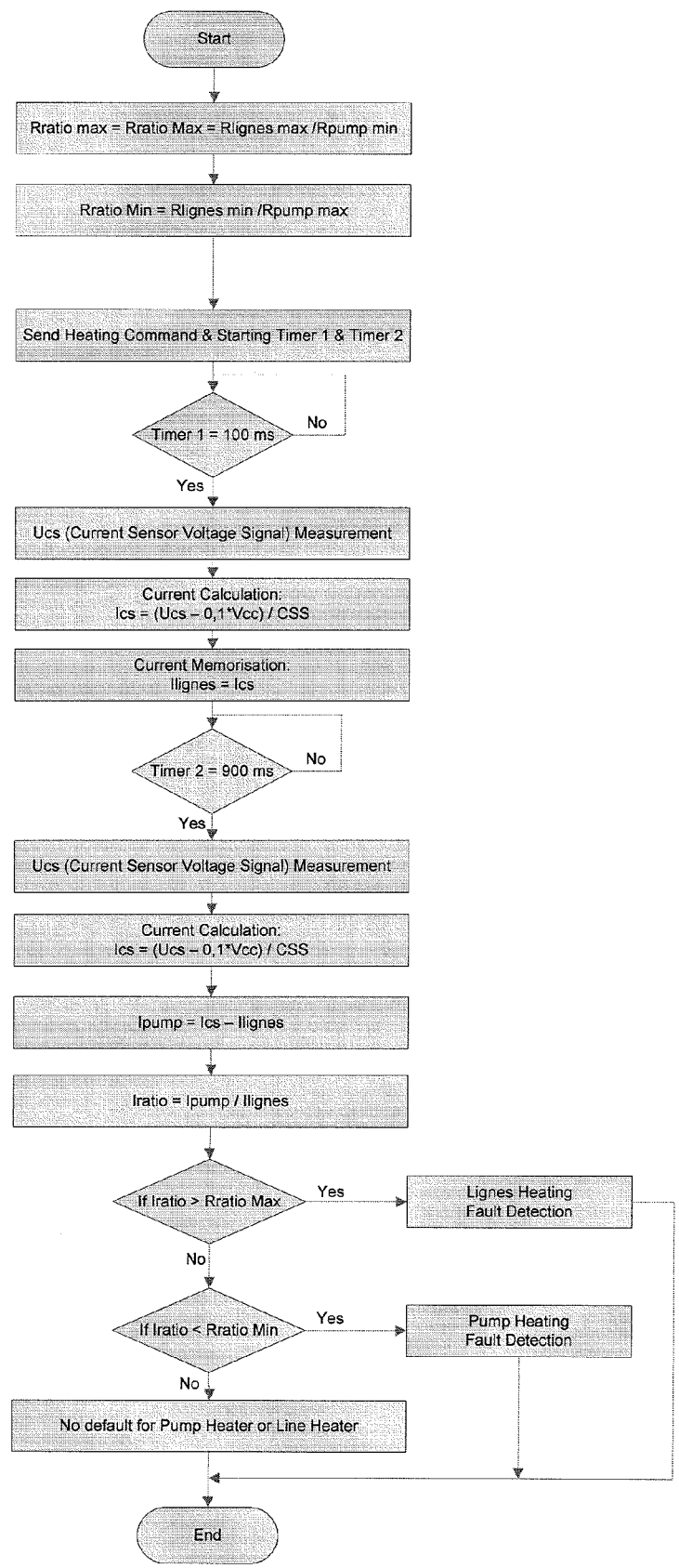

In fact, to be more precise: the current isn't actually measured in that method; it is in fact calculated from the voltage output of the current sensor (as will be clear from FIGS. 3 to 5 and the text related thereto).

The above described diagnosis methods, where the resistors are activated sequentially, are generally performed at the start of a heating process (for instance if the engine is started in frost conditions or if frost is detected while the engine is running).

The present invention finally relates to a system for heating at least one component of an SCR system, this system comprising several resistive heating elements connected in parallel to a current source, a current sensor placed in series with the current source and all the resistors, which are connected in parallel, and a unit for detecting a malfunction of the system that makes it possible to interpret a signal emitted by the sensor.

This detection unit (or diagnosis unit) may be a specific ECU dedicated to this purpose. Alternatively and preferably, it is the same ECU as that which controls the heating and to which the sensor sends its signal (voltage, generally).

The advantageous variants described above in the context of the method can also be applied to the system according to the invention. In particular, one particularly advantageous variant of the latter comprises one independent resistive branch per resistor (as defined above, i.e. connecting each resistor independently to the current source and to ground respectively), and each of these branches is equipped with a commutator. Particularly advantageously, the ECU of this system activates these branches sequentially and in order to do this uses delay devices (for example, time-delay relays) that act on the branches that are activated in a deferred manner (i.e. on all except the first one which is activated directly).

Finally, the present invention also relates to an SCR system equipped with a heating system as described above and that comprises at least one component chosen from a urea tank, a base plate of the latter, a urea feed or return line, a urea filter or pump.

Figure 2:
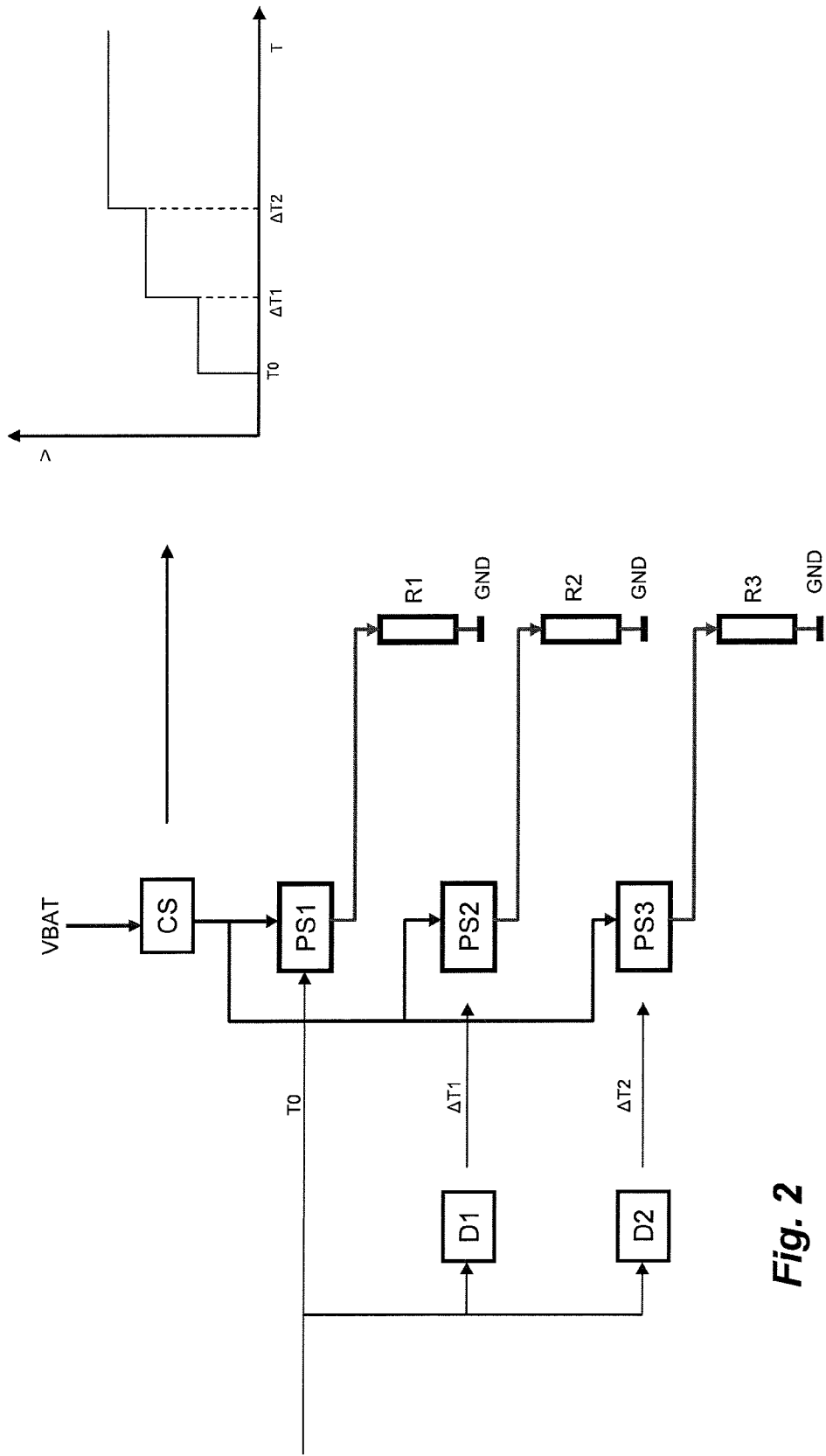

The present invention is illustrated non-limitingly by Tables 1 and 2 and by FIGS. 1 to 5. FIGS. 1 and 2 illustrate the principle of two variants of the present invention and Table 1 explains the calculations related to the operation of a specific case of the 1$^{st}$ variant (according to FIG. 1). Table 2 and FIGS. 3 to 5 relate to a sub-variant (variation) of the second variant (the one of FIG. 2).

In these figures, identical numbers designate identical components.

FIG. 1 schematically illustrates a heating method that uses a current source (VBAT), a commutator (PS or Power Switch), a current sensor (CS), and 3 resistors (R1, R2 and R3) each connected to the vehicle ground (GND) independently.

According to this method, an ECU (not represented) sends, at time T0, a command to the commutator (PS) ordering it to activate the resistors, i.e. to make current flow through the various resistive branches at the same time. From this moment (T0), a current passes through the current sensor (CS), which current is equal to the sum of the currents passing through each resistive branch, and the current sensor generates an output signal (voltage) proportional to this current. From the magnitude of this voltage, it can be checked whether or not all the resistors are functioning and in the case of malfunctioning, the incriminated resistor can be identified, with the provision set forth in the following paragraph . . .

It is namely so that such a method is effective if, for example, R1, R2 and R3 are each equal to about ten ohms with a high precision, if the battery produces a rather constant voltage and if the sensitivity and accuracy of the sensor are good, i.e. in other words: with top quality equipment. However, with most reasonably-priced commercial devices (mass-produced products), the fluctuations of these parameters are such that this method cannot be applied.

Table 1 illustrates this and considers, for example, the case of a urea pump equipped with heating resistor (Rpump) with a nominal (nom) value of 14.4 ohm (but that varies between a minimum (min) value of 13.68 ohm and a maximum (max) value of 15.8 ohm) connected in parallel with a heating resistor (Rlines) intended for urea feed/return lines, the corresponding values of which are (also in ohms) 1.44 ohm (min), 1.8 ohm (nom) and 2.16 ohm (max); on a battery (VBAT) which supplies 12 V (nom) (between 9 V (min) and 16 V (max)).

If, to carry out the diagnostic test on this system (to identify whether the 2 resistors are operating correctly), use is made of a current sensor having the characteristics illustrated in Table 1, namely: a sensitivity (CSS) of 185 mV/A (nom) (179.5 (min) and 190.5 (max)), for an actual supply (Vcc) of 5 V (nom) (4.9 (min) and 5.1 (max)), it will not always be possible to know with certainty whether Rpump is operating correctly since the voltage range generated by the CS when only Rlines is operating or when Rpump and Rlines are both operating has an area of overlap (see Table 1: if the sensor gives a power (voltage) output of from 1.320 to 2.666 V, it is impossible to distinguish between both situations).

Hence, FIG. 2 schematically illustrates an alternative (preferred) variant using 3 separate commutators (PS1, PS2, PS3) (one per resistor (R1, R2, R3)) and also two delay devices (D1, D2) that act on the last 2 commutators (PS2, PS3).

According to this method, an ECU (not represented) sends, at time T0, a command to the commutator (PS1) ordering it to activate resistor R1 only, i.e. to make current flow through it alone. At this moment (T0), the current sensor (CS) generates an output signal (voltage) that is proportional to the current passing through resistor R1 only.

The command sent by the ECU at time T0 has also activated the delay mechanisms D1 and D2 which, respectively at the end of ΔT1 and ΔT2 will activate the commutators PS2 and PS3 to allow current to flow first simultaneously through R1 and R2 at the end of ΔT1, and through R1, R2 and R3 at the end of ΔT2. Hence, if the resistors are operating correctly as illustrated in FIG. 2, a voltage jump is observed at the CS output respectively at the end of T0, ΔT1 and ΔT2. If one of the resistors is defective and does not allow current to flow, the corresponding voltage jump will not be observed and the concerned resistor will be identified.

Such a method is effective regardless of the respective values of the 3 voltage jumps, and therefore regardless of the accuracy of the instruments used.

An even better method, which also allows to get rid of the power (voltage) deviations which are observed in practice (i.e. the fact that the battery doesn't generally generate its nominal voltage), is illustrated by FIGS. 3 to 5 and Table 2. FIG. 3 is the physical lay-out of the system; FIG. 4 explains the functioning of the timers while FIG. 5 is a bloc diagram of the method in question.

In this embodiment, at time (T) equal to T0, the ECU sends a heating command (HC) to the Power Switch of the lines (PSlines), and starts 2 timers (Timer 1 and Timer 2), which are not illustrated on FIG. 3 but the functioning of which is explained in FIGS. 4 and 5.

When Timer 1 reaches a predetermined value (100 ms for instance), the output (Ucs) of the current sensor (CS) is measured and the current in the lines is calculated according to a formula which is specific to the sensor (generally, Ilines=f (Ucs, Vcc, CSS)), where Vcc and CSS are as defined above). This value (Ilines) is stored in the memory of the ECU.

When time (T) is equal to ΔT (which is also a predetermined value of 800 ms for instance), delay mechanism (D) switches on (through the Power Switch of the pump PS pump) the heating of the pump and when Timer 2 reaches a predetermined value (for instance: 900 ms), the power output Ucs is measured again and used to calculate the total current flowing through the sensor, Ics. The corresponding value of the current flowing through the pump (Ipump) may then be calculated as Ipump=Ics−Ilines.

The ratio between Ipump and Ilines or Iratio=Ipump/Ilines is in fact independent from the power generated by the battery VBAT since:

$$Ipump = VBAT/Rpump;$$

$$Ilines = VBAT/Rlines;$$

$$Iratio = (VBAT/Rpump)/(VBAT/Rlines) = Rlines/Rpump$$

Hence, by calculating Rratio max=Rlines max/Rpump min and Rratio min=Rlines min/Rpump max, it is possible to check where Iratio is situated relative to them.

If Iratio>Rratio max, the resistor of the lines does not function.

If Iratio<Rratio min, the resistor of the pump does not function.

If Iratio is comprised into the following range:

$$Rratio\ min < Iratio < Rratio\ max$$

both heating elements function properly.

This is illustrated in Table 2 for the same values of Rpump and Rlines as those of Table 1.

TABLE 2

| | | |
|---|---|---|
| Ratio max of the Heaters Resistances | 0.1579 | Rratio Max = Rlines max/Rpump min |
| Ratio min of the Heaters Resistances | 0.091 | Rratio Min = Rlines min/Rpump max |

If Iratio > Rratio max then Lines Heater default
If Iratio < Rratio min then Pump Heater default

The invention claimed is:

1. A method for heating at least one component of an SCR (Selective Catalytic Reduction) system using several resistive heating elements, according to which these heating elements are fed in parallel by a current source and according to which a current sensor is placed in series with the current source and all the resistors, which are connected in parallel.

2. The method according to claim 1, wherein each resistor is grounded and wherein the current sensor is inserted between the current source and the resistors.

3. The method according to claim 2, wherein an electronic control unit (ECU) conditions the starting/stopping of the heating system by acting on a commutator positioned between the current source and the resistors.

4. The method according to claim 1, wherein the resistors are activated sequentially.

5. The method according to claim 4, wherein the sequential activation is carried out using commutators, one commutator preceding each resistor and these commutators being activated sequentially by an electronic control unit (ECU).

6. The method according to claim 5, according to which the current is measured by the sensor each time a resistor is activated and the ratio of the currents is compared to the ratio of the value (resistance) of the resistors.

7. A system for heating at least one component of an SCR (Selective Catalytic Reduction) system, and which comprises several resistive heating elements connected in parallel to a current source, a current sensor placed in series with the current source and all the resistors, which are connected in parallel, and a unit for detecting a malfunction of the system that makes it possible to interpret a signal emitted by the sensor.

TABLE 1

| | Values | | | | |
|---|---|---|---|---|---|
| | min | nom | max | Unit | Formula |
| Rlines | 1.44 | 1.8 | 2.16 | ohm | |
| Rpump | 13.68 | 14.4 | 15.84 | ohm | |
| VBAT | 9 | 12 | 16 | V | |
| CSS | 179.5 | 185 | 190.5 | mV/A | |
| Vcc | 4.9 | 5 | 5.1 | V | |
| offset = 10% Vcc | 0.49 | 0.5 | 0.51 | V | |
| If only Rlines works | | | | | |
| Ilines = current in Rlines and CS | 4.17 | 6.67 | 11.11 | A | VBAT (min, nom, max)/Rlines (max, nom, min) |
| power output from CS | 1.238 | 1.733 | 2.627 | V | offset + (CSS (min, nom, max)* I1/1000) |
| range of power output from CS if precision of 1.5% | 1.219 | 1.707 | 2.666 | V | (0.985*min, 1.015 * max) |
| If only Rpump works | | | | | |
| Ipump = current in Rpump and CS | 0.57 | 0.83 | 1.17 | A | VBAT (min, nom, max)/Rpump (max, nom, min) |
| power output from CS | 0.592 | 0.654 | 0.733 | V | offset + (CSS (min, nom, max)* I2/1000) |
| range of power output from CS if precision of 1.5% | 0.583 | 0.644 | 0.744 | V | (0.985*min, 1.015 * max) |
| If both Rlines and Rpump work | | | | | |
| current in CS | 4.735 | 7.500 | 12.281 | A | I1 (min, nom, max) + I2 (min, nom, max) |
| power output from CS | 1.34 | 1.888 | 2.849 | V | offset + (CSS (min, nom, max)* (I1 + I2)/1000) |
| range of power output from CS if precision of 1.5% | 1.320 | 1.859 | 2.892 | V | (0.985*min, 1.015 * max) |

8. The system according to claim 7, wherein the detection unit comprises an electronic control unit (ECU) to which the sensor sends a voltage signal, this ECU also controlling the activation of the resistors.

9. The system according to claim 8, comprising one independent resistive branch per resistor, each resistor is independently connected to the current source and grounded respectively, each of these branches being equipped with a commutator and all except one being subjected to the action of a delay mechanism.

10. An SCR (Selective Catalytic Reduction) system equipped with a heating system according to claim 7, this system comprising at least one component selected from the group consisting of a urea tank, a base plate of the urea tank, a urea feed, a urea return line, a urea filter, and a pump.

\* \* \* \* \*